(12) United States Patent
Long et al.

(10) Patent No.: US 11,746,858 B1
(45) Date of Patent: Sep. 5, 2023

(54) MULTI-POWER SOURCE PLANETARY SYSTEM FOR A MACHINE

(71) Applicant: DEERE & COMPANY, Moline, IL (US)

(72) Inventors: Randall L. Long, Coffeyville, KS (US); Cayle D. Harmon-Moore, Independence, KS (US); Stacy K. Worley, Coffeyville, KS (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/692,624

(22) Filed: Mar. 11, 2022

(51) Int. Cl.
  *F16H 3/72* (2006.01)
  *F16H 3/70* (2006.01)

(52) U.S. Cl.
  CPC .............. *F16H 3/70* (2013.01); *F16H 3/727* (2013.01)

(58) Field of Classification Search
  CPC .. B60K 1/02; B60K 2007/003; B60K 17/046; F16H 3/727
  See application file for complete search history.

(56) References Cited

U.S. PATENT DOCUMENTS

| | | | | |
|---|---|---|---|---|
| 3,477,536 A * | 11/1969 | Carini | .................. | B60K 17/145 310/67 R |
| 4,525,661 A | 6/1985 | Mucsy et al. | | |
| 4,554,989 A * | 11/1985 | Gruich | ..................... | B60K 6/00 180/65.265 |
| 4,779,486 A * | 10/1988 | Schumacher | .......... | H02K 16/00 475/5 |
| 7,309,300 B2 * | 12/2007 | Garnett | .................. | B62D 11/16 475/18 |
| 10,895,320 B2 * | 1/2021 | Suyama | ................. | H02K 5/203 |
| 11,008,883 B2 | 5/2021 | Zatorski et al. | | |
| 11,415,199 B2 * | 8/2022 | Fliearman | ............... | F16H 3/663 |
| 2003/0015360 A1 * | 1/2003 | Villeneuve | ........... | B60K 7/0007 180/65.6 |
| 2019/0389467 A1 * | 12/2019 | Morita | ..................... | B60L 15/20 |
| 2022/0196121 A1 * | 6/2022 | Wehlen | ..................... | B60K 1/02 |

FOREIGN PATENT DOCUMENTS

| | | | | |
|---|---|---|---|---|
| CN | 106224471 A | * | 12/2016 | |
| CN | 113733883 A | * | 12/2021 | |
| DE | 102006028790 A1 | * | 1/2008 | ............... B60K 1/00 |
| DE | 102010042801 A1 | * | 4/2012 | ......... A01D 41/1274 |
| DE | 102019206954 A1 | * | 11/2020 | |
| GB | 833515 A | | 4/1960 | |
| WO | WO-2015100630 A1 | * | 7/2015 | ........... B60K 17/046 |

* cited by examiner

*Primary Examiner* — Sherry L Estremsky
(74) *Attorney, Agent, or Firm* — Taft Stettinius & Hollister LLP; Stephen F. Rost

(57) ABSTRACT

A final drive assembly is provided for powering a ground-engaging mechanism of a work machine. The final drive assembly includes a plurality of power-transferring devices each having an output and a planetary gearset assembly including a plurality of planetary inputs and a planetary output. The planetary output is configured to transfer power from the plurality of planetary inputs to the ground-engaging mechanism. Each of the plurality of planetary inputs is coupled to one output of the plurality of power-transferring devices.

14 Claims, 7 Drawing Sheets

MULTI-POWER SOURCE PLANETARY SYSTEM FOR A MACHINE

FIELD OF THE DISCLOSURE

The present disclosure relates to a machine, and in particular, to an agricultural machine having multiple power sources in combination with a planetary system.

BACKGROUND

With many work machines, a final drive assembly is designed for delivering power to wheels or tracks to propel the machine in a travel direction. With sprayers, compact track loaders, graders, windrowers, and other work machines, there is a power requirement and space constraint for the components responsible for delivering the power. In conventional power systems, a large power-transferring device may transfer power to the wheels or tracks. In smaller applications, the space constraint can be overly restrictive for large power-transferring devices. Thus, there is a need to utilize smaller power-transferring devices within a power system to satisfy space constraints and also deliver a requisite amount of power to propel the machine.

SUMMARY

In one embodiment of the present disclosure, a final drive assembly is provided for powering a ground-engaging mechanism of a work machine. The final drive assembly includes a plurality of power-transferring devices each coupled to a plurality of planetary inputs of a planetary gearset assembly. The planetary gearset assembly may include a dual planetary output optionality. For example, the planetary output is configured to transfer power from the plurality of planetary inputs to the ground-engaging mechanism. Each of the plurality of planetary inputs is coupled to one output of the plurality of power-transferring devices.

In one example of this embodiment, the plurality of planetary inputs includes planet gears. In a second example, the plurality of planetary inputs includes planet gears and the plurality output includes a sun gear. In a third example, the plurality of planetary inputs includes planet gears and the plurality output includes a ring gear. In a fourth example, the plurality of power-transferring devices includes electric machines. In a related example, the electric machines are electric motors. In another example, the plurality of power-transferring devices includes hydraulic motors.

In yet another example of this embodiment, the number of plurality of planetary inputs is the same as the number of plurality of power-transferring devices. In a further example, each of the plurality of planetary inputs is operably driven by one of the plurality of power-transferring devices. In yet a further example, a plurality of inverters is configured to receive electrical power from a generator, each of the plurality of inverters being coupled to one of the plurality of power-transferring devices.

In another embodiment of the present disclosure, a final drive assembly is provided for powering a ground-engaging mechanism of a work machine. The final drive assembly includes a plurality of power-transferring devices each comprising an output and a reverser planetary gearset assembly comprising a plurality of planetary inputs, a plurality of idler members, and a planetary output. The planetary output is configured to transfer power from the plurality of planetary inputs to the ground-engaging mechanism. Each of the plurality of planetary inputs is coupled to one output of the plurality of power-transferring devices.

In one example of this embodiment, the plurality of planetary inputs comprises planet gears. In a second example, the plurality of planetary inputs comprises planet gears and the plurality output comprises a sun gear. In a third example, the plurality of planetary inputs comprises planet gears and the plurality output comprises a ring gear.

In another example of this embodiment, the plurality of power-transferring devices comprises electric machines. In yet another example, the plurality of power-transferring devices comprises hydraulic motors. In a further example, the number of idler members is the same as the number of planetary inputs. In yet a further example, each of the plurality of idler members is operably coupled between one of the plurality of planetary inputs and the planetary output.

In a further embodiment of the present disclosure, a final drive assembly is provided for powering a ground-engaging mechanism of a work machine. In this embodiment, the final drive assembly includes a power-generating device for producing power and a plurality of power-transferring devices each comprising an output. The plurality of power-transferring devices are coupled to the power-generating device for receiving the power. The final drive assembly also includes a planetary gearset assembly comprising at least a plurality of planetary inputs, a first planetary output and a second planetary output. The first and second planetary outputs are configured to transfer power from the plurality of planetary inputs to the ground-engaging mechanism. Each of the plurality of planetary inputs is coupled to one output of the plurality of power-transferring devices.

In one example of this embodiment, the planetary inputs comprise planet gears, the first planetary output comprises a sun gear, and the second planetary output comprises a ring gear.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
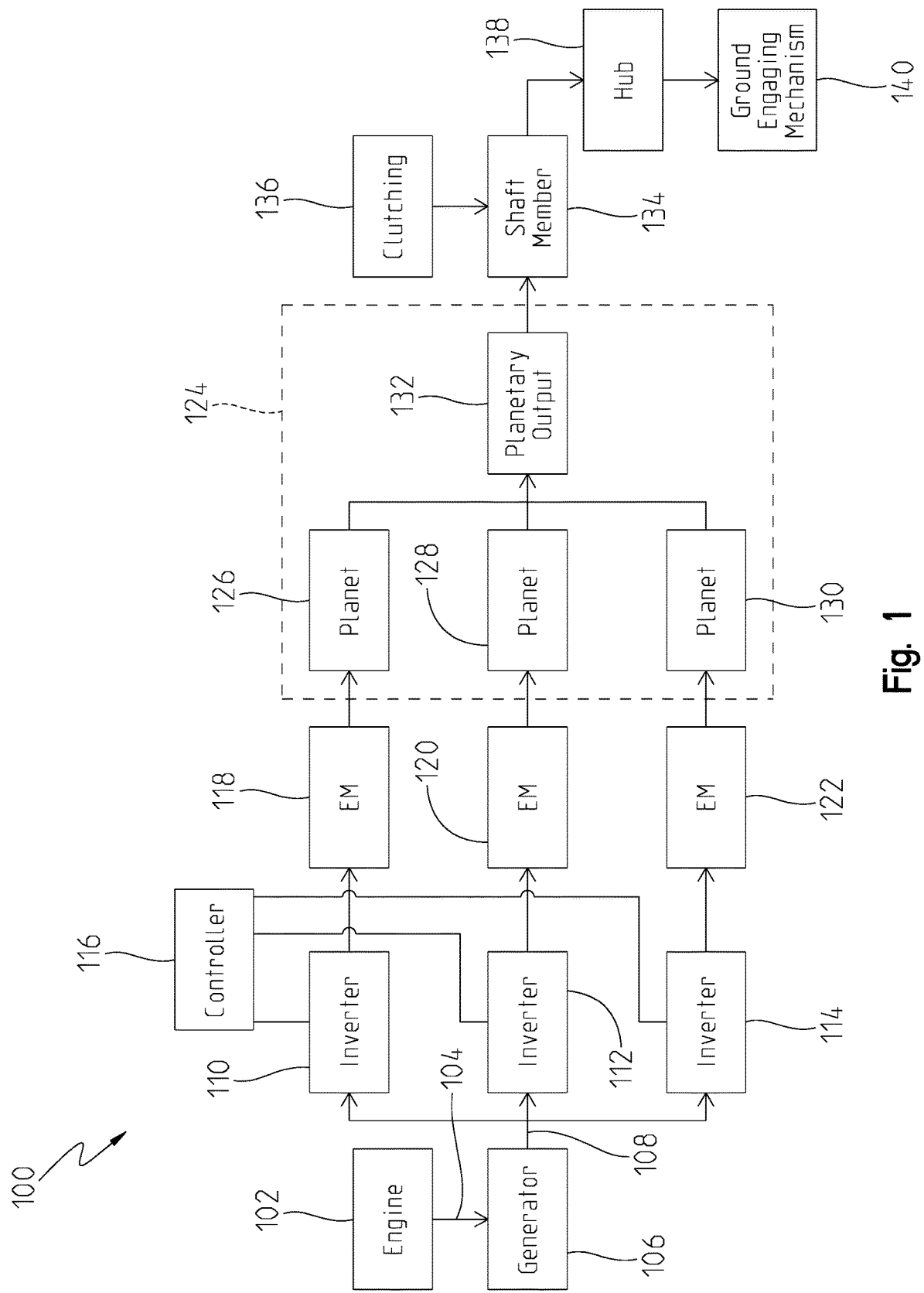
FIG. 1 is a schematic of a final drive system of a work machine for providing power to wheels or tracks.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

In some embodiments, a final drive assembly may include a single large power device such as electric machine. A conventional electric machine may be a machine using electromagnetic forces such as an electric motor, electric generator, and the like. As is known, an electric motor may convert electrical power to mechanical power, whereas an electric generator may convert mechanical power to electrical power.

In other embodiments, the final drive assembly may utilize a hydraulic system for producing mechanical power to drive a wheel or track (i.e., a ground-engaging mechanism). The hydraulic system may include a pump and hydraulic motor, for example, for producing the necessary power to drive the ground-engaging mechanism.

In several embodiments, a final drive assembly may include a planetary gearset assembly to provide the necessary reduction of power to the ground-engaging mechanism. In these systems, however, there can be some issues particularly with electrical systems. For example, many or most electric machines that are used (e.g., to replace hydraulic motors) are well-suited for high speed applications which can in turn put a bigger reduction on the planetary to get it to work correctly. In addition, with most electric machines, there is a significant cost. For instance, in an electric system, large diameter three-phase cables are often used for the electric machine. These cables are expensive and can be cost-prohibitive in some applications. If a smaller electric machine with a smaller cable can be used for the power system, then cost can be reduced. Smaller electric machines, however, often are unable to produce the requisite amount of torque for the work machine. Thus, there is a need for reducing cost but utilizing electric machines in an electric final drive system to transferring power to the ground-engaging mechanism on the machine.

In the present disclosure, a power system utilizing a plurality of power devices, rather than one, for transferring power to a planetary gearset assembly is disclosed. The plurality of power devices are ideally sized and arranged to satisfy a diametrical and axial constraints for the final drive assembly. The axial constraint may seek to limit the extent to which the assembly extends relative to a width of a wheeled assembly or a row spacing so that the assembly does not interfere or contact plants as the machine travels through a field, for example. In an electric final drive assembly, a stator may be provided which defines the diametrical constraint for packaging the electric machines in the assembly.

Referring to FIG. 1, a power system 100 for controlling a final drive assembly of a work machine is disclosed. In this system, the machine may include an engine 102 or other power-producing device. In some embodiments, the engine 102 may be a diesel engine. In other embodiments, the engine 102 may be operable based off any type of fuel. In yet other devices, a battery or motor may be used to produce power. In the illustrated embodiment, the power-producing device 102 produces mechanical power 104. In turn, the mechanical power 104 can be transferred to an electric generator 106 as shown in FIG. 1. The electric generator 106 in turn can convert the mechanical power 104 to electrical power 108.

The electric generator 106 may be coupled to an inverter which may control how much power is consumed by an electrical machine such as an electric motor. In the embodiment of FIG. 1, a plurality of smaller electric machines may be used in place of a single, larger electric machine. In FIG. 1, three electric machines are shown. However, in some embodiments, two electric machines may be used. In other embodiments, four or more electric machines may be used. In the present disclosure, any number of a plurality of electric machines may be used.

In FIG. 1, the plurality of electric machines may include a first electric machine 118, a second electric machine 120, and a third electric machine 122. Each electric machine may be powered by an independent inverter. In FIG. 1, for example, a first inverter 110 may control an amount of power being sent to the first electric machine 118. A second inverter 112 may control an amount of power being sent to the second electric machine 120, and a third inverter 114 may control an amount of power being sent to the third electric machine 122.

In this embodiment, the use of a plurality of electric machines may be such that the electric machines are coupled together. Instead of a three-phase cable or harness being used, a lead and return wires may be used instead for delivering power to the electric machines. Smaller wires or cables can reduce the overall cost of the final drive assembly.

In the present disclosure, the electric machines may receive electrical power from their respective inverter. In one embodiment, one of the plurality of electric machines may be controlled such that it defines how the other electric machines function. In some embodiments, a controller 116 may be in electrical communication with the plurality of inverters for communicating to each inverter how the respective plurality of electric machines should be controlled for a given application. Specifically, the controller 116 may command each inverter to output a speed or torque command to the respective electric machine in a coordinated manner so that the plurality of electric machines are in-sync with each other. Each electric machine may include its own power electronics which can ensure that the desired output is achieved. Thus, each of the plurality of electric machines may be controlled independently of the others. Although not shown, one or more sensors may be associated with a given electric machine and communicate with the inverter or controller 116.

In the embodiment of FIG. 1, the power system 100 may include a planetary gearset assembly 124. The output of the plurality of electric machines may be transferred to the planetary gearset assembly 124 as shown. In one embodiment, the planetary gearset assembly 124 may include a plurality of planet gears (or planets). The plurality of planet gears may be coupled to each of the plurality of electric machines. Thus, the plurality of planet gears may function as an input of the planetary gearset assembly. Power received via the plurality of planet gears may be transferred to an output 132 of the planetary gearset assembly 124. This will be described in further detail below.

In the embodiment of FIG. 1, a first planet gear 126 may be powered by the first electric machine 118, a second planet gear 128 may be powered by the second electric machine 120, and a third planet gear 130 may be powered by the third electric machine 122. In other embodiments, any number of planet gears may be utilized. Moreover, any planetary concept or arrangement (i.e., layout) may be used in the power system. This, for example, may include a simple planetary layout, a reverser planetary layout, or any of the other twelve known fundamental planetary arrangements or layouts.

The planetary output 132 may transfer power to a shaft member 134 as shown. Clutching assembly 136 may be coupled to the shaft member 134 to adjustably control its output to a hub 138 and ground-engaging mechanism 140.

While electric machines are shown in FIG. 1, it is to be understood that this disclosure is not limited to an electric final drive assembly. In some embodiments, the plurality of electric machines may be replaced by a plurality of hydraulic motors. In these embodiments, the generator, the plurality of inverters and plurality of electric machines may be replaced by a hydraulic pump, control valves, and hydraulic motors. Each of the plurality of hydraulic motors may be coupled to a corresponding planet gear of the planetary gearset assembly 124 for driving each planet gear. A controller may control each hydraulic motor to produce a coordinated and in-sync transfer of power to the planet gears.

Figure 2:
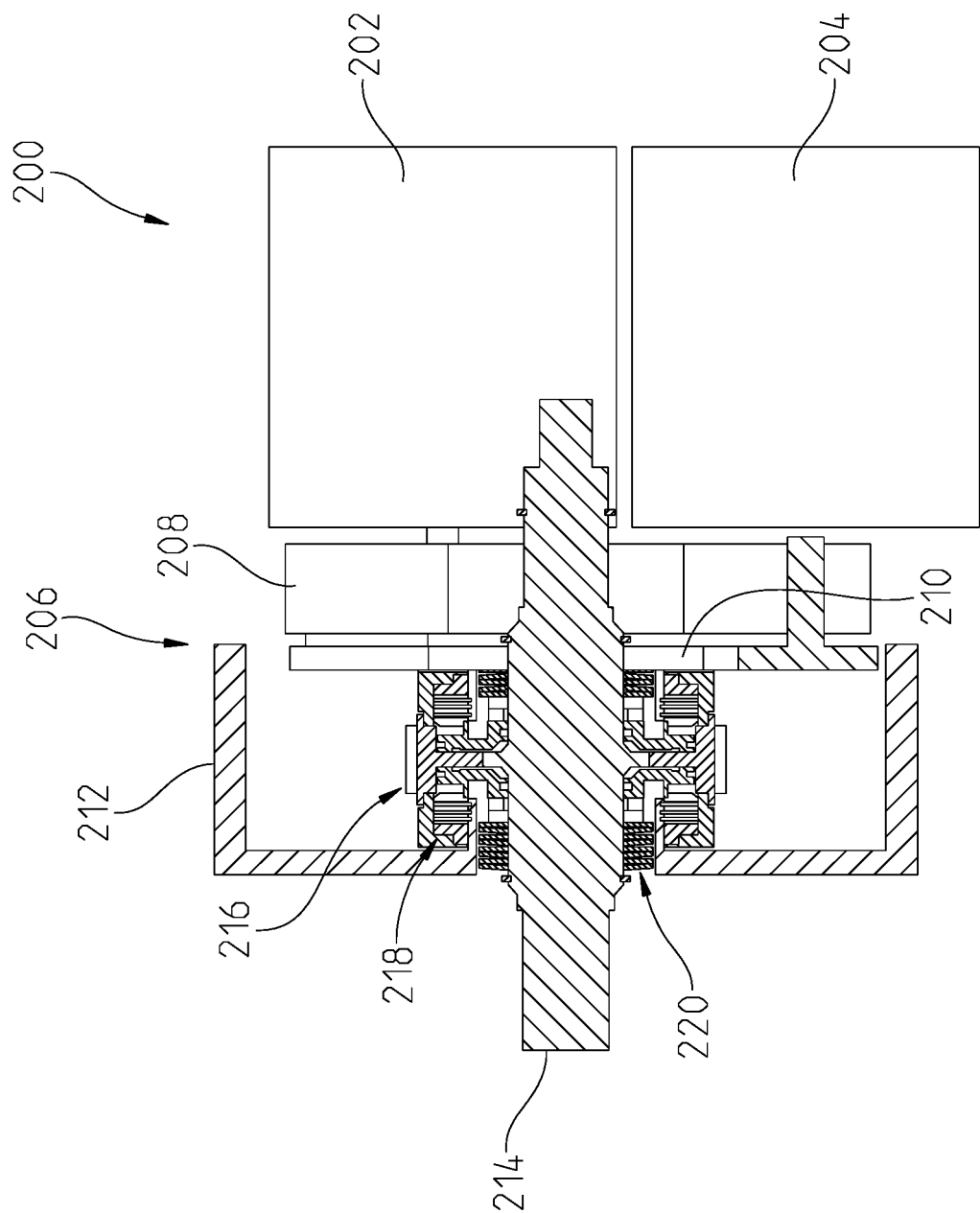
FIG. 2 is a partial cross-sectional side view of a portion of a final drive system.

Referring to FIG. 2 of the present disclosure, an embodiment of a power system 200 is illustrated. In this power system 200, a plurality of electric machines are shown. The plurality of electric machines may include at least a first electric machine 202 and a second electric machine 204. Each electric machine may include its own power electronics and may be electrically coupled to an independent inverter (not shown). While only two electric machines are shown in FIG. 2, the power system 200 may include additional electric machines.

In some embodiments, the power system 200 may include a planetary gearset assembly 206. The planetary gearset assembly 206 may include a plurality of planet gears 208 (or planets) similar to the embodiment of FIG. 1. Each planet gear 208 may be coupled directly to a corresponding electric machine such that each electric machine is powering a separate planet gear. The planetary gearset assembly 206 may also include a sun gear 210 and a ring gear 212, as shown.

The output of the planetary gearset assembly 206 may operably drive or rotate a shaft member 214. The shaft member 214 may be releasably coupled to a clutching assembly 216. In the embodiment of FIG. 2, the clutching assembly 216 may include one or more clutch assemblies, pistons, hubs, and the like. Specifically, as shown in FIG. 2, the clutching assembly 216 may include a first clutch assembly 218 and a second clutch assembly 220. In one embodiment, each clutch assembly may include a plurality of friction plates and reactionary plates, as well as a piston for releasably engaging the clutch assemblies. In some embodiments, the clutching assembly 216 may allow for a plurality of speed functions from the planetary gearset assembly 206.

Figure 3:
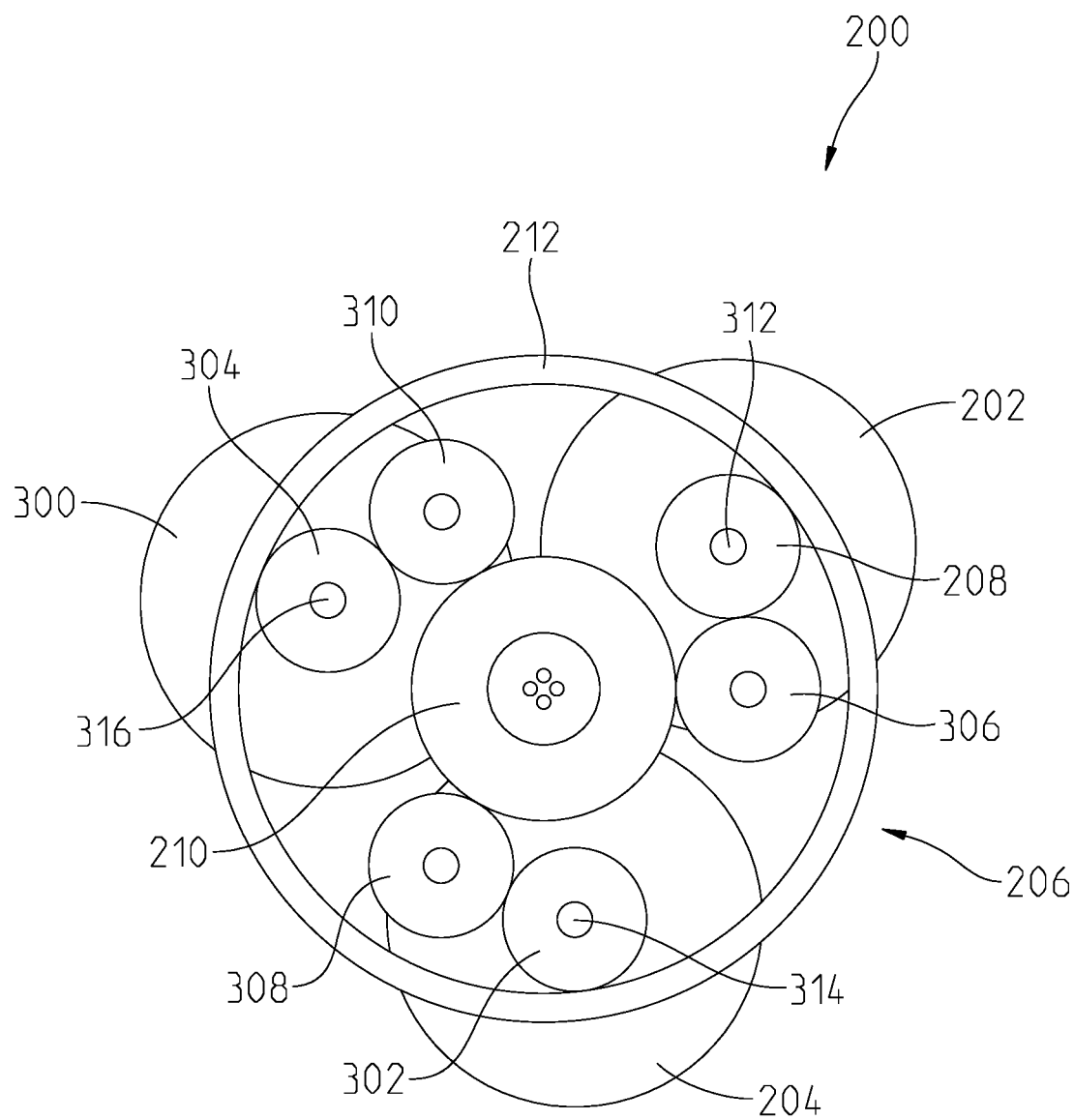
FIG. 3 is a schematic a planetary gearset system of the final drive system of FIG. 2.

In FIG. 3, the power system 200 of FIG. 2 is shown including a third electric machine 300. As described above, the present disclosure is not limited to any number of electric machines. The number of electric machines may be limited based on the size of each electric machine, the space constraint available for the electric machines, as well as the desired output from the plurality of electric machines.

As also shown, the planetary gearset assembly 206 is shown as being arranged as a reverser planetary gearset. Here, the assembly 206 may include a plurality of driven planets operably coupled to the output of a corresponding electric machine. In one embodiment, a first planet gear 208 may be coupled to an output 312 of the first electric machine 202, a second planet gear 302 may be coupled to an output of the second electric machine 204, and a third planet gear 304 may be coupled to the output of the third electric machine 300. Thus, as shown in this embodiment, each electric machine powers a corresponding planet gear so that all of the planet gears of the planetary gearset assembly function as the input of the planetary gearset assembly.

The planetary gearset assembly 206 may also include a plurality of idler gears. For example, the plurality of idler gears may include a first idler gear 306, a second idler gear 308, and a third idler gear 310. Each idler gear may be positioned and in engagement between the sun gear 210 and a corresponding planet gear. For example, the first idler gear 306 may be coupled between the first planet gear 208 and the sun gear 210. The second idler gear 308 may be coupled between the second planet gear 302 and the sun gear 210. The third idler gear 310 may be coupled between the third planet gear 304 and the sun gear 210. In one embodiment, the coupling between gears may be a meshing engagement of teeth of each gear.

In the embodiment of FIG. 3, the powering of each planet gear may further power the ring gear 212. The manner in which output power is transferred from the planetary gearset assembly 206 may vary based on configuration. A brake (not shown) may hold or restrict movement of the ring gear 212 such that power may be transferred from the planet gears to the sun gear 210. The sun gear 210 may rotate and transfer power to the output shaft member 214. Alternatively, the planet gears may be held such that power is transferred to a carrier (not shown) and onto the shaft member 214. In yet another embodiment, the sun gear 210 may be held from rotation and power may be transferred out of the planetary gearset assembly 206 via the ring gear 212. The present disclosure is not limited to which component of the planetary gearset assembly functions as the output.

In other embodiments of the power system 200 of FIG. 2, the planetary gearset assembly 206 may not include any idler gears. Instead, the planetary gearset assembly may be a simple planetary with a sun gear, ring gear, carrier and planet gears. In yet other embodiments, other configurations or layouts of planetary gearset assemblies may be utilized for transferring power from a power-producing device such as an electric machine or hydraulic motor to a ground-engaging mechanism. As is known in the art, there are many different planetary arrangements or layouts (i.e., others may include multiple sun gears, ring gears, etc.) and any one of these may be used in different applications. In any event, regardless of the application or planetary arrangement, the power may come into the planetary gearset assembly via one or more planet gears and may be output via the sun gear, ring gear or carrier.

Figure 4:
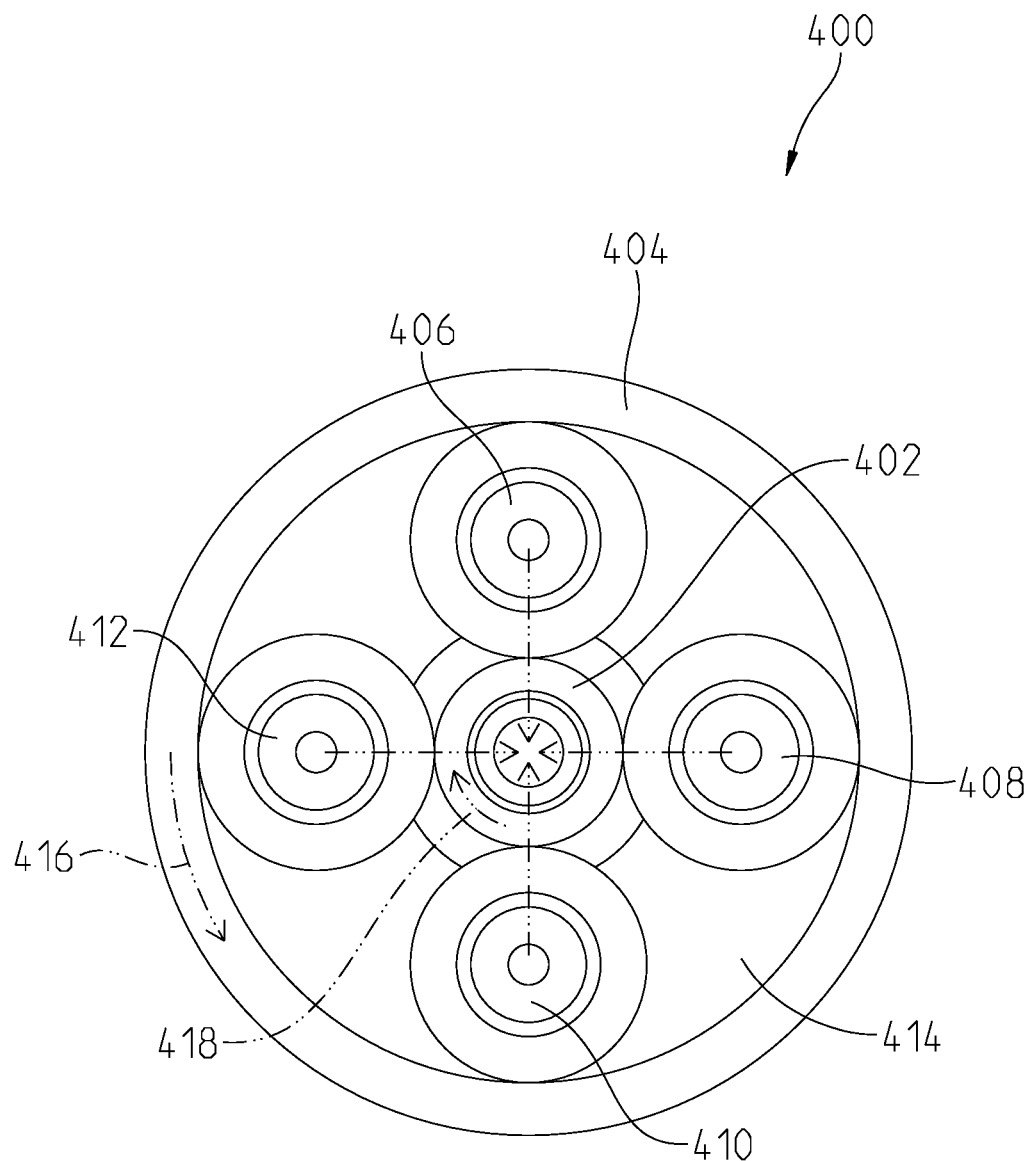
FIG. 4 is a first embodiment of a planetary gearset system of a final drive system.
Figure 5:
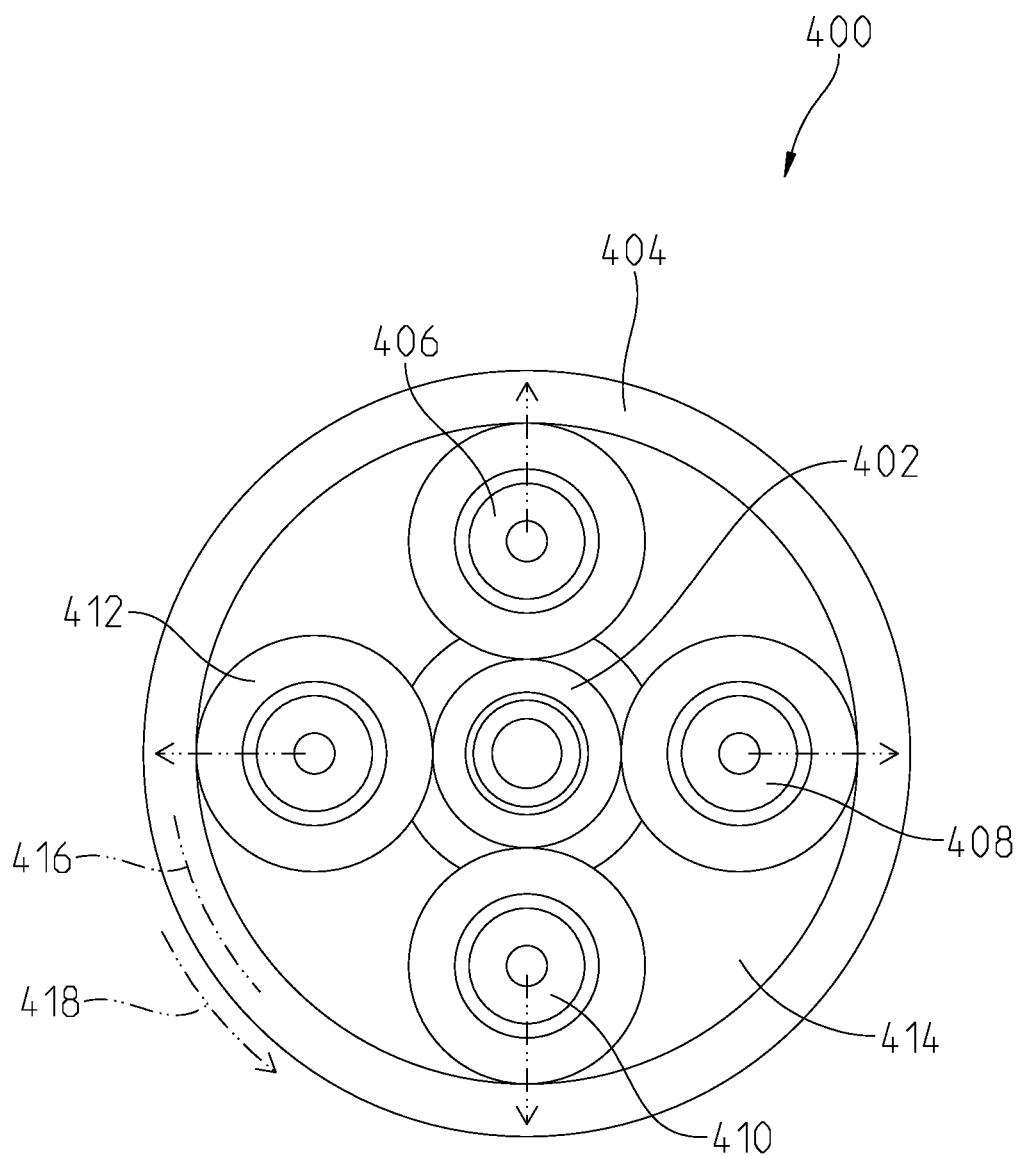
FIG. 5 is a second embodiment of a planetary gearset system of a final drive system.

In FIGS. 4 and 5 of the present disclosure, one embodiment of a planetary gearset assembly 400 is shown. In this embodiment, the planetary gearset assembly 400 is depicted as a simple planetary gearset 400. Here, the planetary gearset assembly 400 may include a sun gear 402, a ring gear 404, a carrier 414 and a plurality of planet gears. The plurality of planet gears may include a first planet gear 406, a second planet gear 408, a third planet gear 410, and a fourth planet gear 412. In this embodiment, there are four planet gears shown. In other embodiments, there may be three planet gears. In some embodiments, there may be two or more planet gears. In several embodiments, there may be five or more planet gears. The number of planet gears may depend on the application. Moreover, in one embodiment of this disclosure, the number of planet gears may be dependent on the number of power-transferring devices such as electric machines or hydraulic motors. In other embodiments of this disclosure, some of the plurality of planet gears may be rotationally driven by a plurality of power-transferring devices while other of the plurality of planet gears may not be rotationally driven.

In the embodiment of FIG. 4, the planet gears function as the input of the planetary gearset assembly 400 and may rotate in a first direction 416. As shown, the first direction may correspond with a counterclockwise direction. Here, the ring gear 404 may be held from rotation such that the planet gears transfer power to the sun gear 402 which functions as the output of the planetary gearset assembly in this embodiment. The sun gear 402 may rotate in a second direction 418. In this embodiment, the second direction 418 may correspond with a clockwise direction, i.e., an opposition direction by which the planet gears turn. The direction of rotation may be controlled by a controller such as the controller 116 of FIG. 1. Other controllers may be used for controlling an output of the electric machines or hydraulic motors to dictate the rotational direction of the planet gears. As such, output via the sun gear may dictate whether the ground-engaging mechanism propels the machine or vehicle in a forward or reverse travel direction.

In FIG. 5, the planetary gearset assembly 400 includes the same components as the one illustrated in FIG. 4. In other words, the embodiment of FIG. 5 is a simple planetary gearset. Here, however, the input of the planetary gearset assembly 400 is via the planet gears and the output is via the ring gear 402. The planet gears may rotate in the first direction which again corresponds with a counterclockwise direction. The ring gear 402, however, turns in the second direction 418 which corresponds with the counterclockwise direction in this embodiment. Thus, the rotational direction of the ring gear may be the same as the rotational direction of the planet gears.

Figure 6:
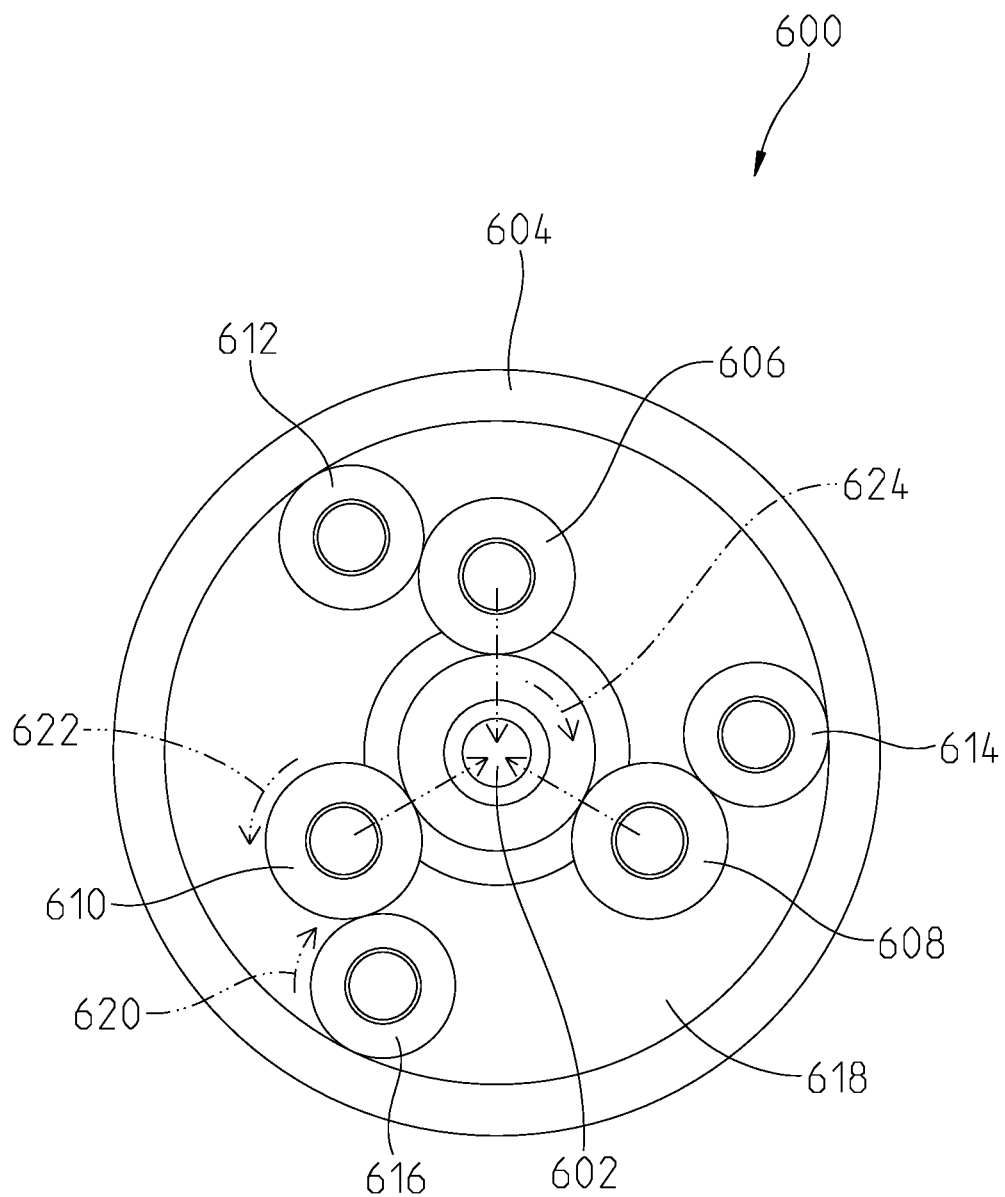
FIG. 6 is a third embodiment of a planetary gearset system of a final drive system.
Figure 7:
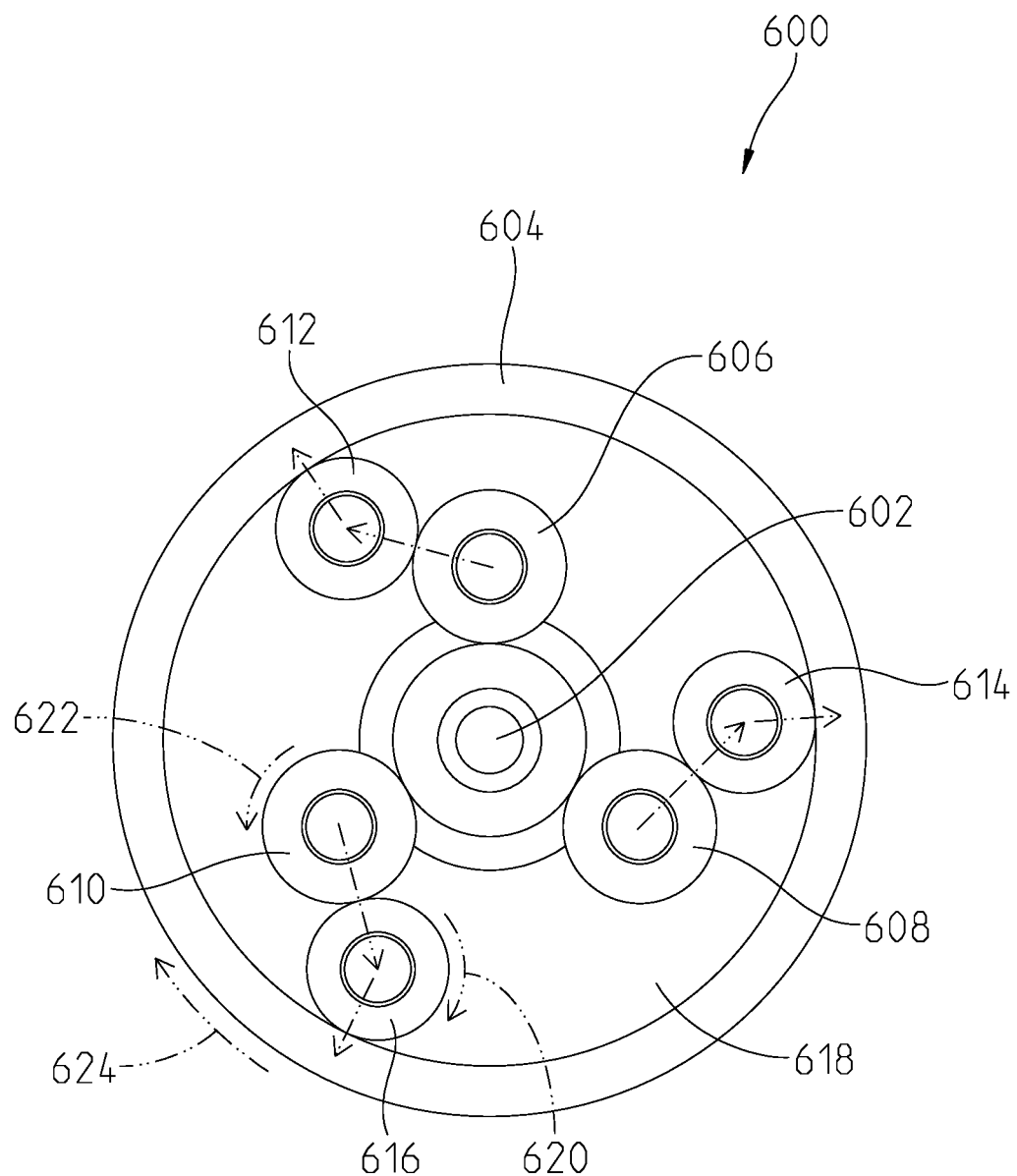
FIG. 7 is a fourth embodiment of a planetary gearset system of a final drive system.

Referring to FIGS. 6 and 7, another embodiment of the present disclosure is illustrated. Here, a planetary gearset assembly 600 is arranged as a reverse planetary having a plurality of planet gears and a plurality of idler gears. This arrangement is similar to that of FIG. 3. In any event, the planetary gearset assembly 600 may include a sun gear 602, a ring gear 604, a carrier 618, a first idler gear 606, a second idler gear 608, a third idler gear 610, a first planet gear 612, a second planet gear 614, and a third planet gear 616. The first idler gear 608 may be coupled between the first planet gear 612 and the sun gear 602. The second idler gear 610 may be coupled between the second planet gear 614 and the sun gear 602. Similarly, the third idler gear 612 may be coupled between the third planet gear 616 and the sun gear 602. The coupling between the different gears may be a meshing engagement of teeth on each gear. Thus, torque may be transferred between gears via the meshing engagement of their respective teeth.

In this embodiment, there are three planet gears and three idler gears shown. In other embodiments, there may be four planet and idler gears. In some embodiments, there may be two or more planet and idler gears. In several embodiments, there may be five or more planet and idler gears. In one embodiment, the number of planet gears may be the same as the number of idler gears. In another embodiment, the number of planet gears may differ from the number of idler gears. As described above, the number of planet gears may depend on the application. Moreover, in one embodiment of this disclosure, the number of planet gears may be dependent on the number of power-transferring devices such as electric machines or hydraulic motors. In other embodiments of this disclosure, some of the plurality of planet gears may be rotationally driven by a plurality of power-transferring devices while other of the plurality of planet gears may not be rotationally driven.

In the embodiment of FIG. 6, the planet gears function as the input of the planetary gearset assembly 600 and may rotate in a first direction 620. In FIG. 6, the first direction 620 may correspond with a clockwise direction. Here, the ring gear 404 may be held from rotation such that the planet gears transfer power to the sun gear 402 via the idler gears. The idler gears may rotate in a second rotational direction 622 which is opposite the first rotational direction 620. In other words, the idler gears may rotate in a counterclockwise direction. In this embodiment, the sun gear 602 functions as the output of the planetary gearset assembly 600. The sun gear 402 may rotate in a third direction 624. In this embodiment, the third direction 624 may correspond with a clockwise direction, i.e., an opposition direction by which the idler gears turn but in the same rotational direction as the planet gears. Similar to the embodiment of FIG. 4, the direction of rotation may be controlled by a controller such as the controller 116 of FIG. 1. Other controllers may be used for controlling an output of the electric machines or hydraulic motors to dictate the rotational direction of the planet gears. As such, output via the sun gear may dictate whether the ground-engaging mechanism propels the machine or vehicle in a forward or reverse travel direction.

In FIG. 7, the planetary gearset assembly 600 includes the same components as the one illustrated in FIG. 6. In other words, the embodiment of FIG. 7 is shown as a reverser planetary gearset. Here, however, the input of the planetary gearset assembly 600 is via the planet gears and the output is via the ring gear 604. The planet gears may again rotate in the first direction 620 which again corresponds with a clockwise direction. The idler gears may rotate in a second rotational direction 622 which is opposite the first rotational direction 620. In other words, the idler gears may rotate in a counterclockwise direction. The ring gear 604 functions as the output of the planetary gearset assembly 600 and rotates in a third rotational direction 624 which corresponds with the clockwise direction in this embodiment. Thus, the rotational direction of the ring gear 604 may be the same as the rotational direction of the planet gears.

In several embodiments such as in FIGS. 4 and 6, the ring gear and carrier may be held stationary to allow the sun gear to function as the output of the planetary gearset assembly. In other embodiments such as in FIGS. 5 and 7, the sun gear and carrier may be held stationary (e.g., via a brake) to allow the ring gear to function as the output of the planetary gearset assembly.

In some embodiments, a controller may be provided which controls the output of the planetary gearset assembly via shift logic and the like. For example, the controller may operably control the output being through the sun gear 602 such as in FIG. 6 or the ring gear 604 as in FIG. 7. Different speeds and output torques may thus be transferred to the ground-engaging mechanism as the different components of the planetary gearset assembly is controlled. Moreover, different speed functions may be achieved by controlling the clutching assembly 216 as previously described. Further, the present disclosure can reduce the costs of many conventional electric final drive assemblies by utilizing a plurality of smaller power-transferring devices such as electric motors to drive the planet gears of a single planetary gearset assembly.

While exemplary embodiments incorporating the principles of the present disclosure have been described herein, the present disclosure is not limited to such embodiments.

Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. A final drive assembly for powering a ground-engaging mechanism of a work machine, comprising:
   a plurality of power-transferring devices each comprising an output; and
   a planetary gearset assembly comprising a plurality of planetary inputs and a planetary output, the planetary output configured to transfer power from the plurality of planetary inputs to the ground-engaging mechanism;
   wherein, each of the plurality of planetary inputs is coupled to one output of the plurality of power-transferring devices;
   wherein, each of the plurality of inputs comprises planet gears and the planetary output comprises a sun gear or a ring gear.

2. The final drive assembly of claim 1, wherein the plurality of power-transferring devices comprises electric machines.

3. The final drive assembly of claim 2, wherein the electric machines comprise electric motors.

4. The final drive assembly of claim 1, wherein the plurality of power-transferring devices comprises hydraulic motors.

5. The final drive assembly of claim 1, wherein the number of plurality of planetary inputs is the same as the number of plurality of power-transferring devices.

6. The final drive assembly of claim 1, wherein each of the plurality of planetary inputs is operably driven by one of the plurality of power-transferring devices.

7. The final drive assembly of claim 1, further comprising a plurality of inverters configured to receive electrical power from a generator, the plurality of inverters each being coupled to one of the plurality of power-transferring devices.

8. A final drive assembly for powering a ground-engaging mechanism of a work machine, comprising:
   a plurality of power-transferring devices each comprising an output; and
   a reverser planetary gearset assembly comprising a plurality of planetary inputs, a plurality of idler members, and a planetary output, the planetary output configured to transfer power from the plurality of planetary inputs to the ground-engaging mechanism;
   wherein, each of the plurality of planetary inputs is coupled to one output of the plurality of power-transferring devices;
   wherein, each of the plurality of inputs comprises planet gears and the planetary output comprises a sun gear or a ring gear.

9. The final drive assembly of claim 8, wherein the plurality of power-transferring devices comprises electric machines.

10. The final drive assembly of claim 8, wherein the plurality of power-transferring devices comprises hydraulic motors.

11. The final drive assembly of claim 8, wherein the number of idler members is the same as the number of planetary inputs.

12. The final drive assembly of claim 8, wherein each of the plurality of idler members is operably coupled between one of the plurality of planetary inputs and the planetary output.

13. A final drive assembly for powering a ground-engaging mechanism of a work machine, comprising:
    a power-generating device for producing power;
    a plurality of power-transferring devices each comprising an output, the plurality of power-transferring devices being coupled to the power-generating device for receiving the power; and
    a planetary gearset assembly comprising at least a plurality of planetary inputs, a first planetary output and a second planetary output, the first and second planetary outputs configured to transfer power from the plurality of planetary inputs to the ground-engaging mechanism;
    wherein, each of the plurality of planetary inputs is coupled to one output of the plurality of power-transferring devices;
    wherein, the plurality of planetary inputs comprises planet gears, and the first planetary output and the second planetary output comprises a sun gear or a ring gear.

14. The final drive assembly of claim 13, wherein:
    the first planetary output comprises a sun gear; and
    the second planetary output comprises a ring gear.

* * * * *